(12) United States Patent
Markowitz

(10) Patent No.: US 7,113,352 B2
(45) Date of Patent: Sep. 26, 2006

(54) ANNULAR OR PENANNULAR PRISM

(76) Inventor: Samuel N. Markowitz, 1225 Davenport Road, Toronto Ontario (CA) M6H 2H1

( * ) Notice: Subject to any disclaimer, the term of this patent is extended or adjusted under 35 U.S.C. 154(b) by 23 days.

(21) Appl. No.: 10/883,318

(22) Filed: Jul. 1, 2004

(65) Prior Publication Data

US 2006/0001979 A1    Jan. 5, 2006

(51) Int. Cl.
*G02B 5/04* (2006.01)
*G02C 7/02* (2006.01)

(52) U.S. Cl. .................. 359/831; 351/41; 351/159; 351/175

(58) Field of Classification Search .............. 359/831; 351/175

See application file for complete search history.

(56) References Cited

U.S. PATENT DOCUMENTS

| | | | |
|---|---|---|---|
| 3,423,151 A | 1/1969 | White | |
| 4,772,113 A | 9/1988 | Parker | |
| 5,155,508 A | 10/1992 | Onufryk | |
| 5,381,191 A * | 1/1995 | Levy | 351/57 |
| 5,969,790 A * | 10/1999 | Onufryk | 351/175 |

FOREIGN PATENT DOCUMENTS

JP    2002310626 A  * 10/2002

OTHER PUBLICATIONS

Norman J. Weiss, An Application of Cemented Prisms with Severe Field Loss, The Optician, Jul. 7, 1962, pp. 261-264, vol. 163.

Eli Peli, Field Expansion for Homonymous Hemianopia by Optically Induced Peripheral Extropia, Optometry and Vision Science, Sep. 2000, pp. 453-464, vol. 77, No. 9.

\* cited by examiner

*Primary Examiner*—Scott J. Sugarman
*Assistant Examiner*—Darryl J. Collins
(74) *Attorney, Agent, or Firm*—Michael Best & Friedrich LLP

(57) ABSTRACT

An annular prism capable of causing light (or other radiation) to either converge or diverge is defined by an annulus of material which is transparent to the light (or other radiation). The annulus tapers radially towards either its outer periphery or its central aperture. If the annulus tapers towards its outer periphery, light converges. If the annulus tapers towards its central aperture, light diverges. The degree of tapering determines the degree of convergence or divergence. A cross section of the annulus formed by a plane containing a principal axis of the annulus viewed on only one side of the principal axis may have a triangular shape. In some embodiments, a segment of the annulus may be missing, resulting in a penannular prism which causes light (or other radiation) to converge or diverge about the principal axis of the incomplete annulus for some angular measure less than 360 degrees.

20 Claims, 7 Drawing Sheets

ANNULAR OR PENANNULAR PRISM

FIELD OF THE INVENTION

The present invention relates to lenses and prisms, and more particularly to lenses and prisms capable of converging or diverging light or other forms of radiation.

BACKGROUND OF THE INVENTION

In the field of optics, the use of lenses is commonplace. As is well known in the art, a lens is a piece of glass, plastic, or other transparent material with opposite surfaces, either or both of which are curved, by means of which light rays are refracted so that they converge or diverge to form an image. The shape of a lens determines whether the lens will cause light travelling parallel to the principal axis of the lens to converge or diverge. More particularly, lenses that are thicker at their center and thinner at their periphery cause light to converge. Such converging lenses are commonly used to correct hyperopia (farsightedness), an abnormal condition of the eye in which vision is better for distant objects than for near objects as a result of improper focusing of the image of a near object behind the retina rather than on it.

In contrast, lenses that are thinner at their center and thicker at their periphery, on the other hand, cause light to diverge. Such diverging lenses are commonly used to correct myopia (nearsightedness), a condition in which vision is better for near objects than for distant objects as a result of improper focusing of the image from a distant object in front of the retina rather than on it.

Lenses may also be used to converge or diverge forms of radiation other than light.

A novel approach towards converging or diverging light or other radiation would be desirable.

SUMMARY OF THE INVENTION

An annular prism capable of causing light (or other radiation) to either converge or diverge is defined by an annulus of material which is transparent to the light (or other radiation). The annulus tapers radially towards either its outer periphery or its central aperture. If the annulus tapers towards its outer periphery, light converges. If the annulus tapers towards its central aperture, light diverges. The degree of tapering determines the degree of convergence or divergence. A cross section of the annulus formed by a plane containing a principal axis of the annulus viewed on only one side of the principal axis may have a triangular shape. In some embodiments, a segment of the annulus may be missing, resulting in a penannular prism which causes light (or other radiation) to converge or diverge about the principal axis of the incomplete annulus for some angular measure less than 360 degrees.

In accordance with an aspect of the present invention there is provided an annular prism for refracting radiation, comprising: an annulus of material transparent to the radiation, the annulus having a radially directed taper from a first edge of the annulus to a second edge of the annulus, the first edge being defined by one of an outer periphery of the annulus and a central aperture of the annulus, the second edge being defined by the other of the outer periphery of the annulus and the central aperture of the annulus, the radially directed taper being a straight line taper such that a notional radially directed line extending from the first edge to the second edge along a front or rear surface of the annulus is a substantially straight line.

In accordance with another aspect of the present invention there is provided a penannular prism for refracting radiation, comprising: an incomplete annulus of material transparent to the radiation, the incomplete annulus having a radially directed taper from a first edge of the incomplete annulus to a second edge of the incomplete annulus, the first edge being defined by one of an outer periphery of the incomplete annulus and a central aperture of the incomplete annulus, the second edge being defined by the other of the outer periphery of the incomplete annulus and the central aperture of the incomplete annulus, the radially directed taper being a straight line taper such that a notional radially directed line extending from the first edge to the second edge along a front or rear surface of the incomplete annulus is a substantially straight line.

In accordance with yet another aspect of the present invention there is provided eyeglasses comprising: a lens; and an annular prism attached to the lens, the prism including an annulus of transparent material, the annulus having a radially directed taper from a first edge of the annulus to a second edge of the annulus, the first edge being defined by one of an outer periphery of the annulus and a central aperture of the annulus, the second edge being defined by the other of the outer periphery of the annulus and the central aperture of the annulus, the radially directed taper being a straight line taper such that a notional radially directed line extending from the first edge to the second edge along a front or rear surface of the annulus is a substantially straight line.

In accordance with still another aspect of the present invention there is provided eyeglasses comprising: a lens; and a penannular prism attached to the lens, the prism including an incomplete annulus of transparent material, the incomplete annulus having a radially directed taper from a first edge of the incomplete annulus to a second edge of the incomplete annulus, the first edge being defined by one of an outer periphery of the incomplete annulus and a central aperture of the incomplete annulus, the second edge being defined by the other of the outer periphery of the incomplete annulus and the central aperture of the incomplete annulus, the radially directed taper being a straight line taper such that a notional radially directed line extending from the first edge to the second edge along a front or rear surface of the incomplete annulus is a substantially straight line.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
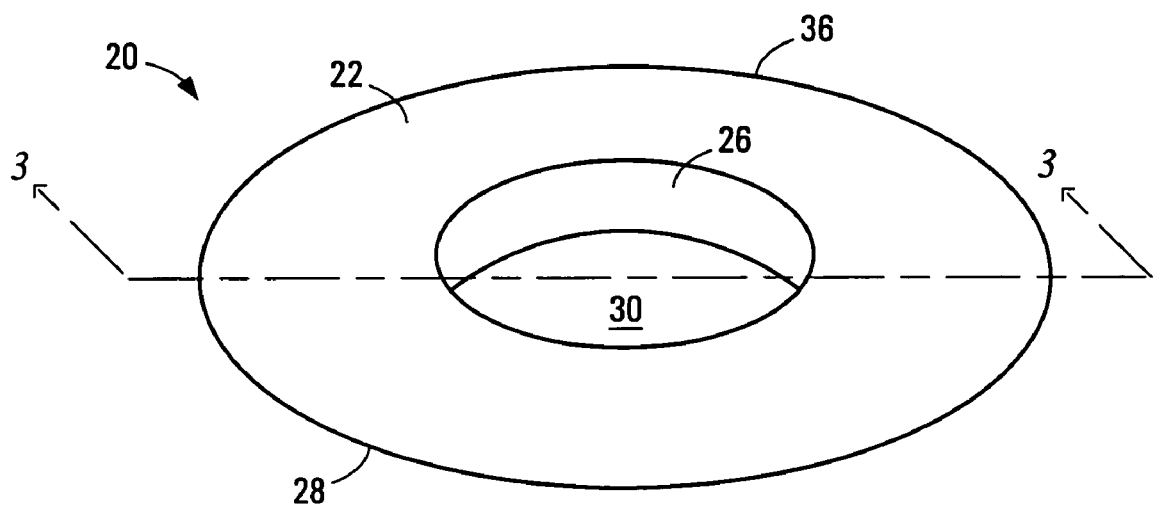
FIG. 1 is a perspective view of a first embodiment of an annular prism.
Figure 2:
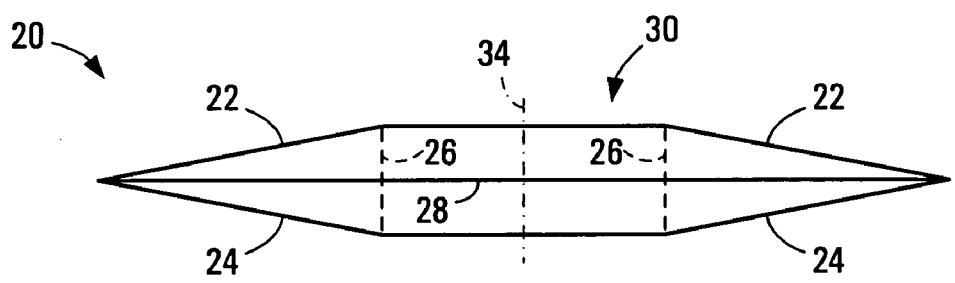
FIG. 2 is a side elevation view of the annular prism of FIG. 1.
Figure 3:
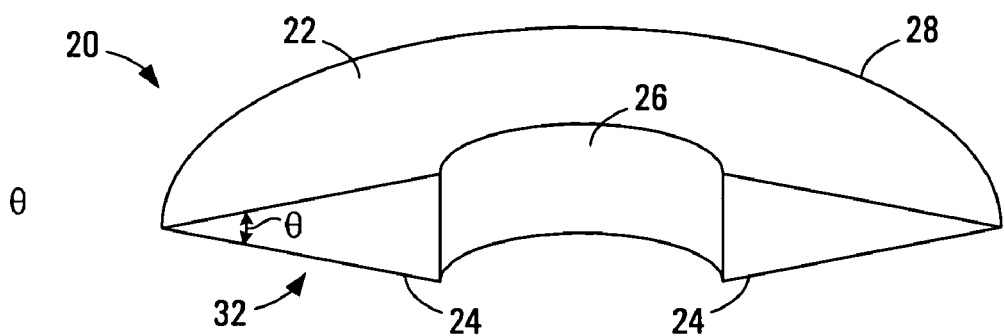
FIG. 3 is a perspective view of a cross section the annular prism of FIG. 1 taken along line 3—3 of FIG. 1.

Referring to FIGS. 1–3, an annular prism 20 exemplary of a first embodiment of the present invention is illustrated in perspective view, in side elevation view, and in cross sectional perspective respectively. Annular prism 20 is capable of causing light travelling parallel to principal axis 34 (FIG. 2—described below) to converge. Prism 20 may thus be referred to as a "converging annular prism".

As illustrated, annular prism 20 comprises an annulus 36 of transparent material, such as glass or plastic, having a central aperture 30. The annulus 36 has a front surface 22, a rear surface 24, and a cylindrical inner surface 26. As best seen in FIGS. 2 and 3, annulus 36 tapers towards its outer periphery, with the front and rear surfaces 22 and 24 ultimately converging to form the outer circumference 28 of the annulus 36.

As shown in FIG. 3, a cross section of the annular prism 20 formed by a plane that contains the principal axis 34 of the annulus 36 yields a pair of triangular sections. Looking at the cross section on only one side of the principal axis 34 (i.e. such that the cross section is bounded by a first notional, radially directed line extending from the annulus' central aperture 30 along front surface 22 to the outer circumference 28, a second notional, radially directed line extending from the annulus' central aperture 30 along the rear surface 24 to the outer circumference 28, and inner surface 26), front surface 22, rear surface 24, and inner surface 26 can be seen to form an isosceles triangle 32. The triangle 32 has two sides of equal length which correspond to the front and rear surfaces 22 and 24 and one dissimilar length side corresponding to inner surface 26. The one dissimilar length side of the triangle 32 is parallel to the principal axis 34 (FIG. 2).

The shape of the annular prism 20 matches the three-dimensional volume that would be defined by rotating triangle 32 a full 360 degrees about principal axis 34 (FIG. 2). The inner surface 26 is accordingly coaxial with principal axis 34.

The front and rear surfaces 22 and 24 of prism 20 are each optically finished. As known by those skilled in the art, an optically finished surface is one that has been created, cut, ground, or polished to become smooth, with greater smoothness resulting in greater refraction of light or radiation in the desired direction. Inner surface 26 is not necessarily optically finished.

The degree of peripheral tapering of the annulus 36 is indicated by the angle θ between the front surface 22 and rear surface 24 (FIG. 3). This angle determines the degree to which light will converge and thus defines the dioptric power of the annular prism 20. A larger angle results in a higher dioptric power.

The converging annular prism is annular to avoid undue central prism thickness which would result absent the central aperture in view of the angle θ between the front and rear surfaces of the prism.

Figure 4:
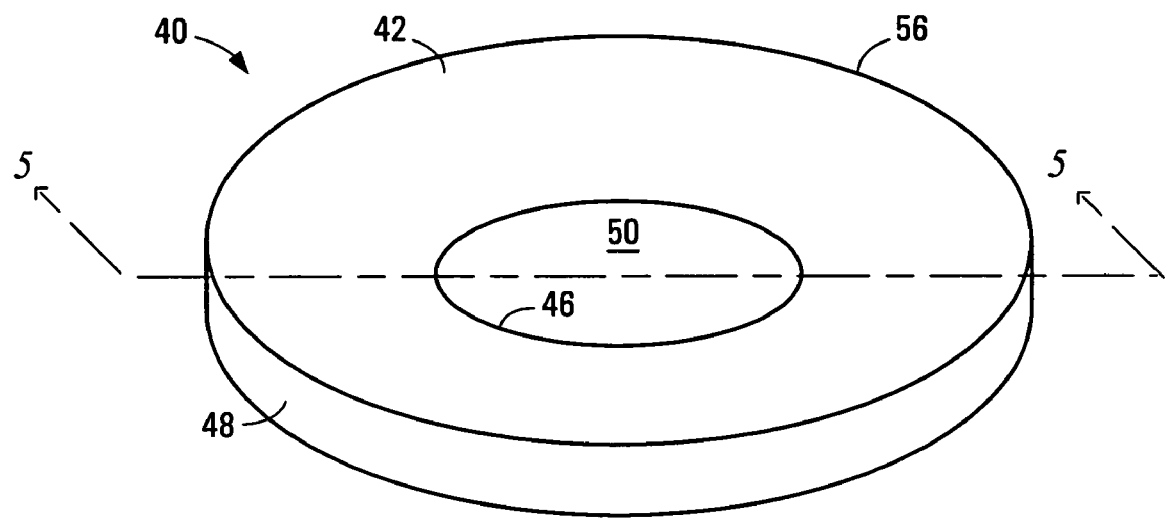
FIG. 4 is a perspective view of a second embodiment of an annular prism.
Figure 5:
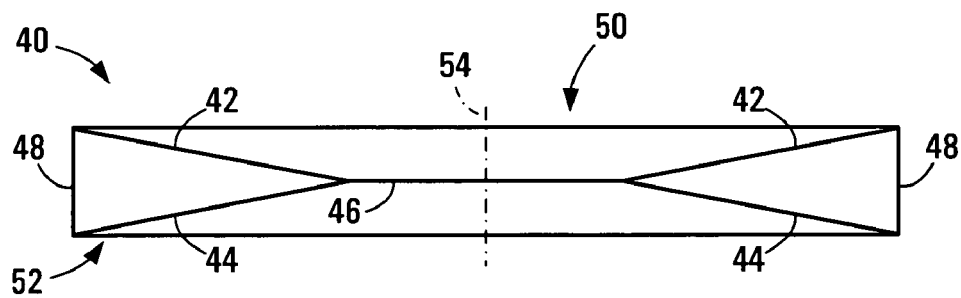
FIG. 5 illustrates a cross section of the annular prism of FIG. 4 taken along line 5—5.
Figure 6:
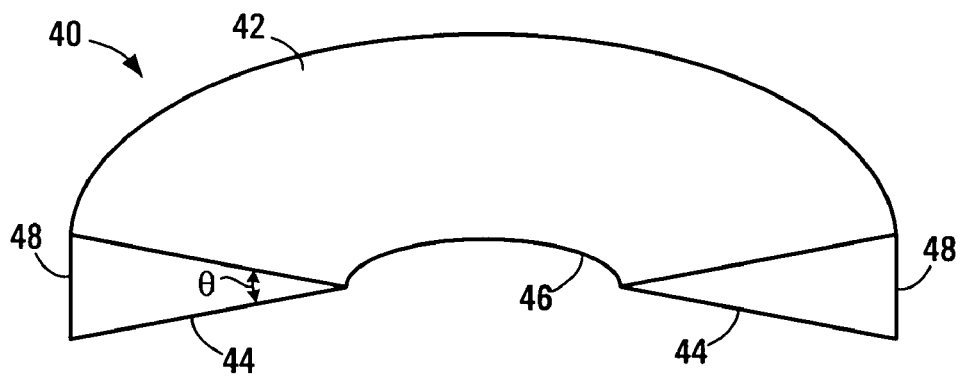
FIG. 6 is a perspective view of the cross section of FIG. 5.

FIGS. 4–6 illustrate a second annular prism 40 exemplary of a further embodiment of the present invention in perspective view, cross section, and cross sectional perspective respectively. The prism 40 is capable of causing light travelling parallel to the principal axis 54 (FIG. 5) to diverge, and may thus be referred to as a "diverging annular prism".

Diverging annular prism 40 comprises an annulus 56 of transparent material having a central aperture 50. The annulus 40 has a front surface 42, a rear surface 44 and a cylindrical peripheral surface 48. As best seen in FIGS. 5 and 6, the annulus 56 tapers towards its central aperture 50 (i.e. towards the principal axis 54 of the annulus 56). The front and rear surfaces 42 and 44 ultimately converge to form the inner circumference 46 of the annulus 56.

As shown in FIG. 5, a cross section of the annular prism 20 formed by a plane that is perpendicular to the principal axis 34 of the annulus 36 yields a pair of triangular sections. Looking at the cross section on only one side of the principal axis 54 (i.e. such that the cross section is bounded by a first notional, radially directed line extending from the annulus' peripheral surface 48 along front surface 42 to central aperture 30, a second notional, radially directed line extending from the annulus' peripheral surface 48 along rear surface 44 to central aperture 30, and peripheral surface 48), the front surface 42, rear surface 44 and peripheral surface 48 can be seen to form an isosceles triangle 52. The triangle 52 has two sides of equal length which correspond to the front and rear surfaces 42 and 44 and a one dissimilar length side corresponding to peripheral surface 48. The one dissimilar length side is parallel to the principal axis 54.

The shape of the annular prism 40 matches the three-dimensional volume that would be defined by rotating triangle 52 a full 360 degrees about principal axis 54. The peripheral surface 48 is accordingly coaxial with principal axis 54.

The front and rear surfaces 42 and 44 of diverging annular prism 40 are optically finished. The peripheral surface 48 is not necessarily optically finished.

The degree of central tapering of the annulus 56 is indicated by the angle θ (FIG. 6) between the front surface 42 and rear surface 44. This angle determines the degree to which light will diverge and thus defines the dioptric power of the annular prism 40, with a larger angle resulting in a higher dioptric power. The angle θ is such that convergence of the front an rear surfaces 42 and 44 occurs some radial distance away from the principal axis 54.

Figure 7:
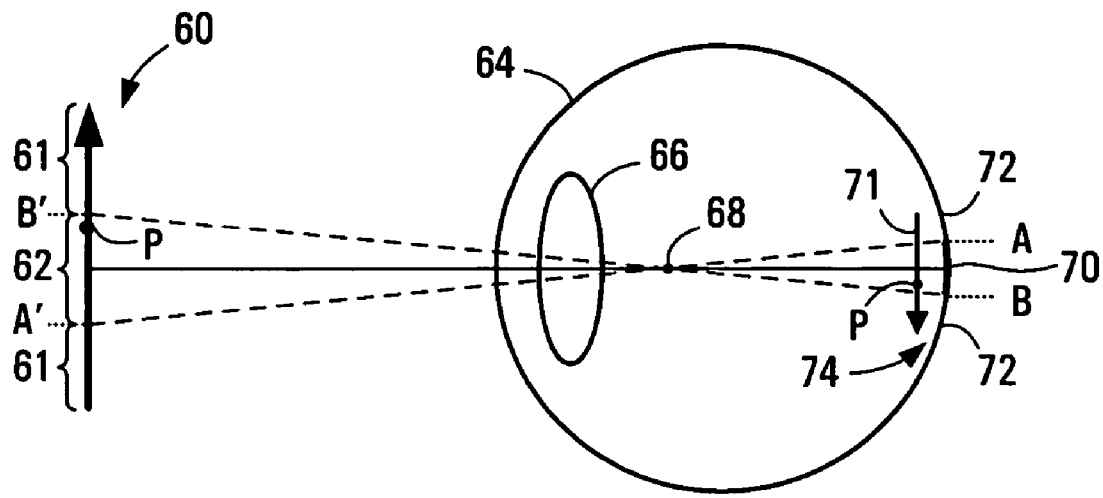
FIG. 7 illustrates an eye with central field vision loss.
Figure 8:
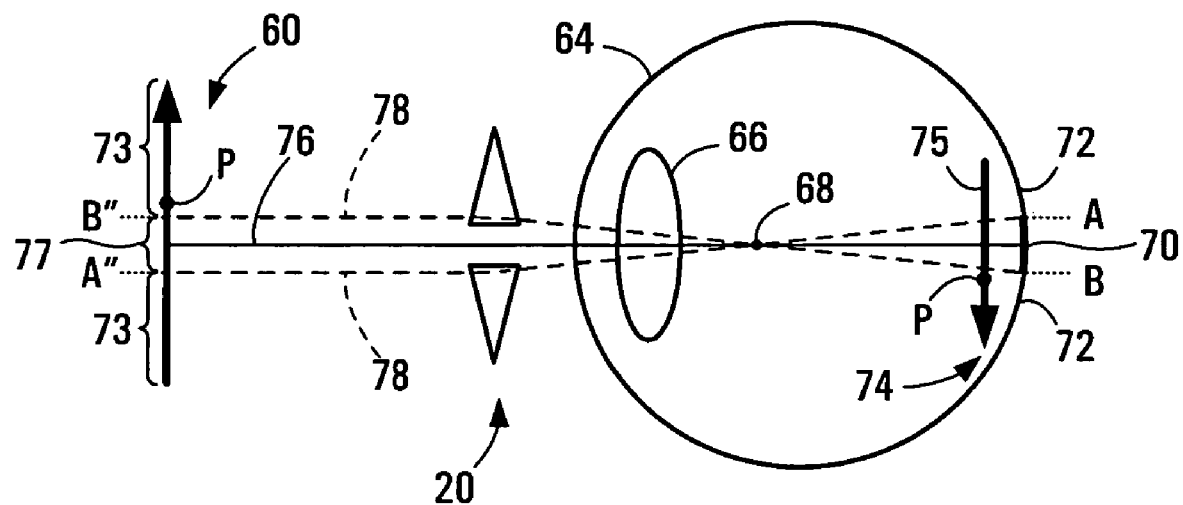
FIG. 8 illustrates operation of a converging annular prism to compensate for central field vision loss.
Figure 9:
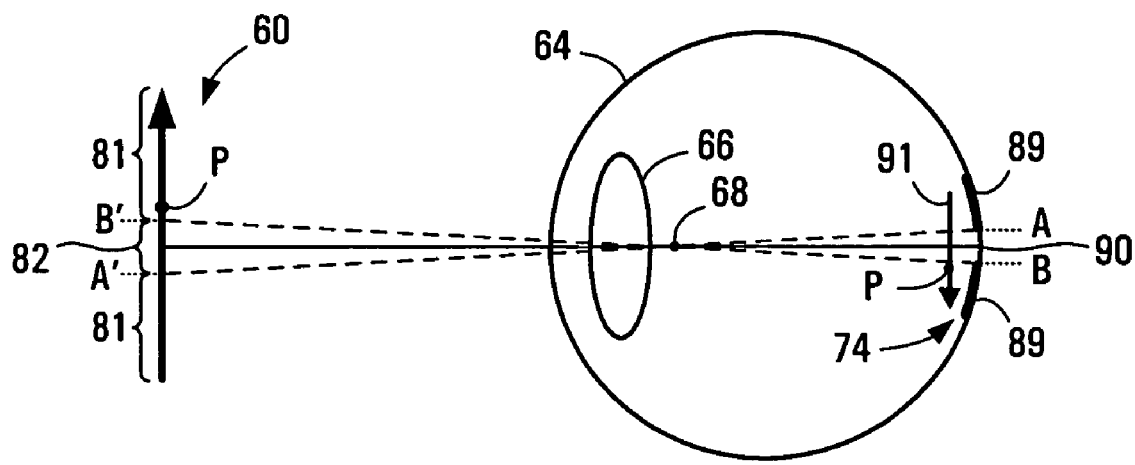
FIG. 9 illustrates an eye with peripheral field vision loss.
Figure 10:
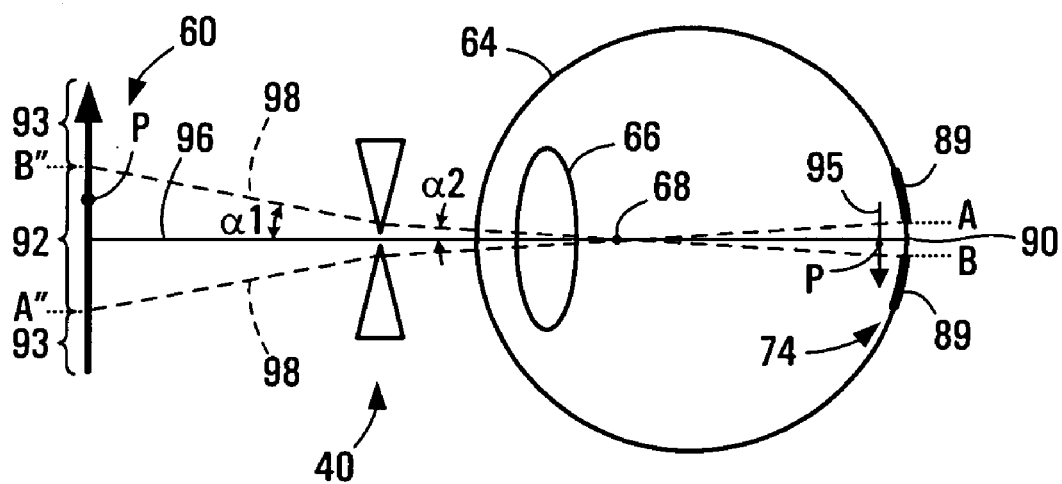
FIG. 10 illustrates operation of a diverging annular prism to compensate for peripheral field vision loss.

FIGS. 7–10 illustrate exemplary applications of annular prisms in compensating for certain types of vision defects. In particular, FIGS. 7 and 8 illustrate use of a converging annular prism 20 to compensate for loss of a central field of vision, and FIGS. 9 and 10 illustrate use of a diverging annular prism 40 to compensate for loss of peripheral fields of vision.

Referring first to FIG. 7, an eyeball 64 having central degeneration 70 (e.g. macular degeneration) of retina 74 is illustrated. The eyeball 64 has a lens 66 and together form an optical system with a nodal point 68 so that light from a target object 60 crosses the nodal point 68 and casts an image 71 of the object onto the retina 74. It will be appreciated that nodal point 68 is characteristic to the eyeball 64 and lens 66 and is therefore fixed for a particular shaped of eyeball 64 and lens 66. As a result of the central degeneration 70, the portion of image 71 falling between points A and B on retina 74 is not perceived. Any features of the object 60 in the central area 62, i.e. between points A' and B', such as point P for example, are therefore not seen.

The portion of the image 71 which falls in area 72, however, which is outside degenerated area 70, can be perceived. The upper and lower parts 61 of the object 60 are therefore visible.

It should be appreciated that, although not apparent from the two dimensional illustration of FIG. 7, in which area 72 is shown to be above and below the degenerated area 70, area 72 actually surrounds the degenerated area 70 on the retina. Accordingly, central field vision loss should be understood not to occur only vertically on retina 74, but in all directions on retina 74 (e.g. laterally, diagonally, etc.).

FIG. 8 illustrates the use of a converging annular prism 20 to compensate for the central field vision loss illustrated in FIG. 7. Eyeball 64 of FIG. 8 has the same central degeneration 70 between points A and B of retina 74 as in FIG. 7. With annular prism 20 in place in front of eyeball 64, light rays 78 travelling parallel to principal axis 76 of the annulus of prism 20 are refracted by the prism 20 so as to converge towards the principal axis 76. The refracted light then passes through nodal point 68 of the optical system formed by eyeball 64 and lens 66 and results in an image 75 of the object being cast onto retina 74. Because of the refraction performed by the converging annular prism 20, the height of the image 75 that is cast upon the retina 74 is effectively larger than it would be without the prism. As a result, a smaller percentage of the image 75 falls upon the degenerated area 70. Thus, while it is still true that a central part 77 of the object 60 (between A" and B") cannot be seen, the unseen part 77 when the annular prism 20 is in place is smaller than the unseen part 62 (FIG. 7) when the prism 20 is absent. Put another way, the upper and lower parts 73 of the object 60 which can be seen now represent a larger percentage of the object. Advantageously, the converging annular prism 20 allows point P of object 60, which was previously unseen, to be perceived, because the image of point P now falls upon functional retina area 72.

It should be appreciated that, because refraction by prism 20 occurs 360 degrees around the principal axis 76, image 75 on retina 74 is expanded not only vertically, but also laterally. The size of the inner circumference of the annular prism 20 is selected based on the size of the degenerated area.

Referring now to FIG. 9, an eyeball 64 having peripheral degeneration 89 (e.g. retinitis pigmentosa) of retina 74 is illustrated. The eyeball 64 has a lens 66 and together form an optical system with a nodal point 68 so that light from a target object 60 crosses the nodal point 68 and casts an image 91 of the object onto the retina 74. As a result of the peripheral degeneration 89, the portions of image 93 falling above point A and below point B on retina 74 are not perceived. Any features in upper and lower parts 81 of the object 60, i.e. below point A' and above point B', such as point P for example, are therefore not seen. The portion of the image 93 which falls in central area 90, however, can be perceived. The central part 82 of the object 60 is therefore visible.

FIG. 10 illustrates the use of a diverging annular prism 40 to compensate for the peripheral field vision loss illustrated in FIG. 9. Eyeball 64 of FIG. 10 has the same peripheral degeneration 89 above and below points A and B of retina 74 as in FIG. 9. With annular prism 40 in place in front of eyeball 64, light rays 98 travelling from target object 60 of the annulus of prism 40 are refracted by the prism as shown in FIG. 10. More specifically, light rays 98 entering the prism 40 at angle α1 to the principal axis 96 exit the prism 40 at angle α2 to the principal axis 96, where α2<α1. The refracted light then passes through nodal point 68 of the optical system formed by eyeball 64 and lens 66 and results in an image 95 of the object being cast onto retina 74. Because of the refraction performed by the diverging annular prism 40, the height of the image 95 that is cast upon the retina 74 is effectively smaller than it would be without the prism. As a result, a larger percentage of the image 75 falls upon the functional area 90 of retina 74. Thus, while it is still true that a the upper and lower parts 93 of the object 60 (below A" and above B") cannot be seen, the unseen parts 93 when the annular prism 40 is in place are lesser than the unseen parts 81 (FIG. 9) when the prism 40 is absent. Put another way, the central part 92 of the object 60 which can be seen now represents a larger percentage of the object. Advantageously, the diverging annular prism 40 allows point P of object 60, which was previously unseen, to be perceived, because the image of point P now falls upon functional retina area 90.

Again, it should be appreciated that, because refraction by prism 40 occurs 360 degrees around the principal axis 96, the size of image 95 on retina 74 is reduced not only vertically, but also laterally.

Figure 11:
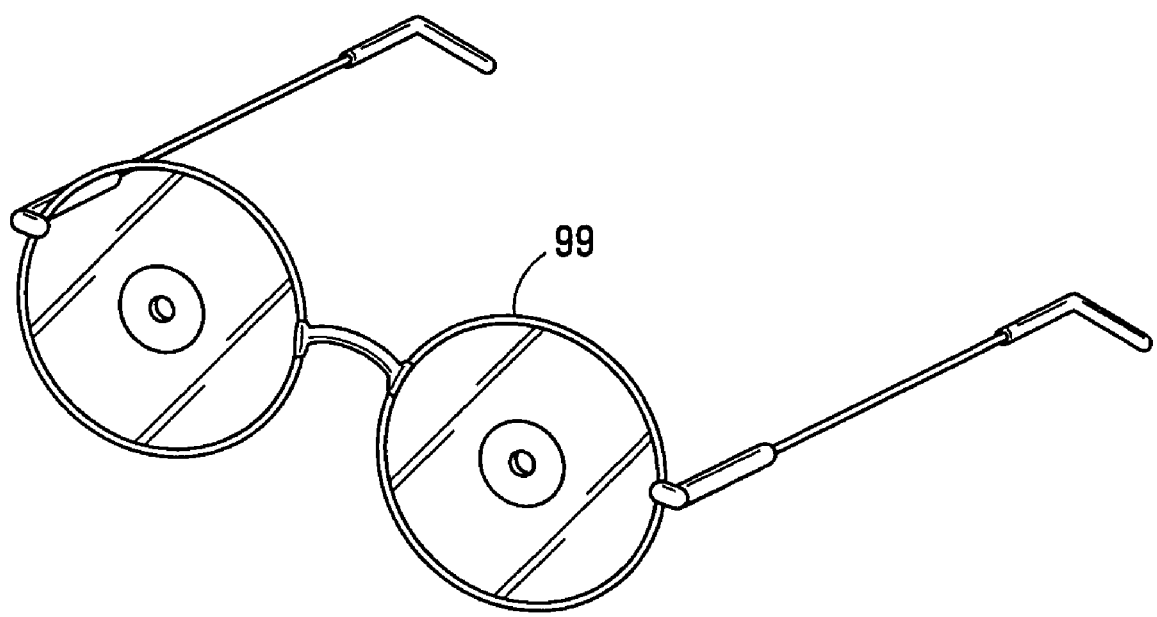
FIG. 11 illustrates conventional eyeglasses having an annular prism attached to each lens.

So that it may be used as described above in conjunction with FIGS. 7–10, a converging or diverging annular prism 20 or 40 may be attached to each lens of conventional (or non-corrective) eyeglasses 99 as shown in FIG. 11. Depending upon the type of field loss in each eye, different prisms may be attached to each lens. For example, the degree of tapering of the prisms (i.e. the angle θ) may be different for each prism if the size of the degenerated retinal area in each eye is different. Alternatively, if the field loss is central in one eye and peripheral in the other, one eyeglass lens may have an attached converging annular prism 20 while the other lens has an attached diverging annular prism 40. The characteristics of the prisms to be attached to eyeglass lenses are not dependent on the characteristics of the eyeglass lenses.

Not all prisms exemplary of an embodiment of the present invention are necessarily annular. Some prism embodiments may be penannular. A penannular prism is defined by an incomplete annulus, i.e., an annulus with some portion (i.e. a sector) of the annulus being absent. A penannular prism thus spans an angular measure that is less than 360 degrees. For example, a penannular prism may span only 180 degrees, in which case the prism would approximate a "C" shape. Such a penannular prism, when viewed in perspective, would look like the perspective cross section of FIG. 3. This assumes that the prism is a converging penannular prism. A diverging penannular prism spanning 180 degrees would instead look like the perspective cross section shown in FIG. 6.

In operation, a penannular prism causes light to converge or diverge, as described above in conjunction with FIGS. 7–10, about the principal axis of the annulus, except that the converging or diverging of light only occurs for the angular measure spanned by the incomplete annulus (less than 360 degrees). For clarity, the "principal axis" of an incomplete annulus is understood to refer to the principal axis of the annulus which would result if the missing portion of the incomplete annulus was in fact present.

Figure 12:
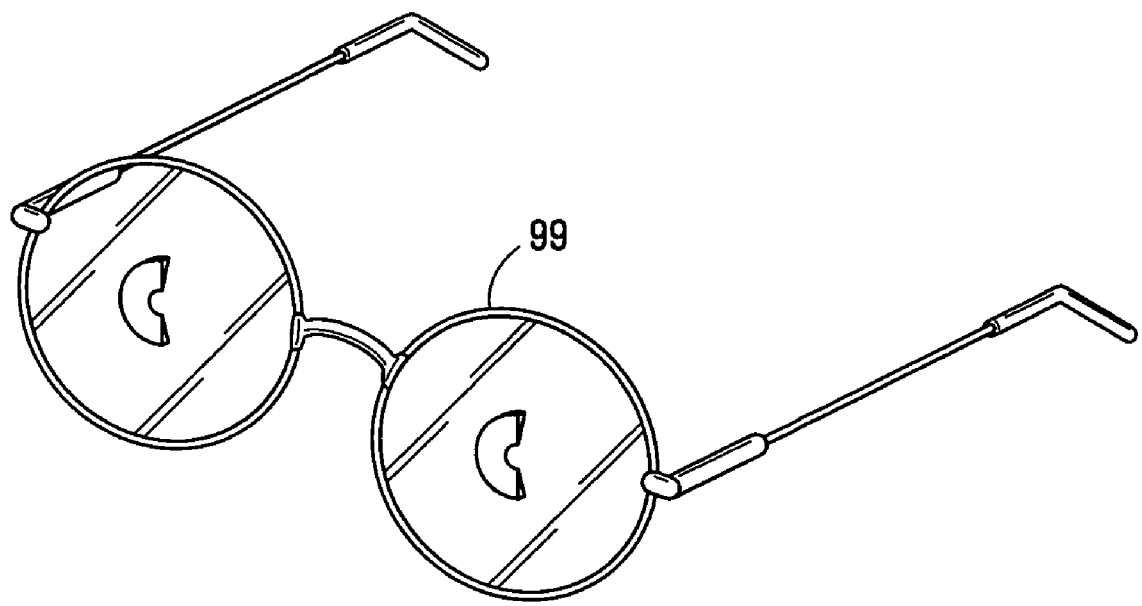
FIG. 12 illustrates conventional eyeglasses having a pen-annular prism attached to each lens.

As shown in FIG. 12, penannular prisms may be affixed to conventional (or non-corrective) eyeglasses 99 in the same manner as annular prisms. Penannular prisms spanning 180 degrees may for example be employed to compensate for hemiopsia, a defect of vision in consequence of which only half of an object is seen. The orientation of the prism on each lens may be different, depending upon the orientation of the degenerated retinal area and field loss of each eye.

It will be appreciated that annular or penannular prisms are not necessarily only capable of converging or diverging light. Annular and penannular prisms may also be capable of causing forms of radiation other than light to converge or diverge. Such prisms need only be transparent to the form of radiation that is caused to converge or diverge. For example, charged particles such as electrons may be refracted by an annular or penannular prism comprising a magnetic field.

In addition to being suitable for compensating for certain types of vision defects, annular and penannular prisms may also be suitable for various other applications in which light or other radiation is converged or diverged. For example, an annular prism may be used to compact an image viewed under a microscope, so that a larger portion of the image may be seen (albeit at a lesser magnification).

Figure 13:
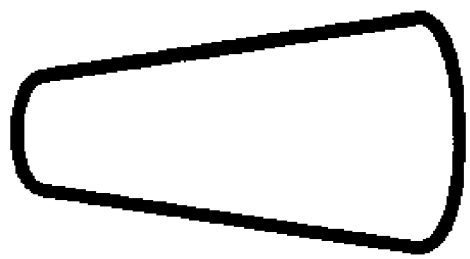
FIG. 13 illustrates a number of exemplary prism cross section shapes in alternative prism embodiments.
Figure 13:
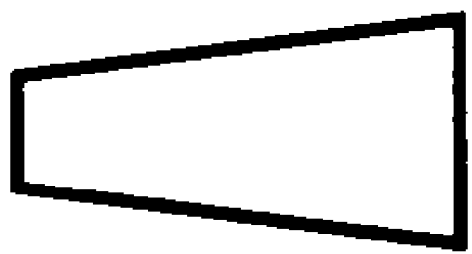
Figure 13:
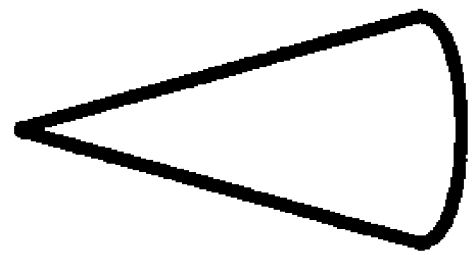
Figure 13:
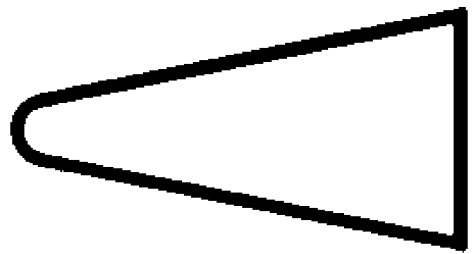

As will be appreciated by those skilled in the art, modifications to the above-described embodiment can be made without departing from the essence of the invention. For example, a cross section formed by a plane perpendicular to a principal axis of the annulus, when viewed on only one side of the principal axis (i.e. with the relevant cross section portion being bounded on two sides by a first notional, radially directed line extending along a front surface of the annulus between a first edge defined by the annulus' central aperture and a second edge defined by the outer periphery of the annulus and a second notional, radially directed line extending along the rear surface of the annulus from the first edge to the second edge), may have a shape that is not triangular. The cross section may instead have various other shapes, such as those as shown at 100 in FIG. 13 for example. In each case, the annulus has a radially directed taper, which in the case of a converging prism is directed radially away from the principal axis, and in the case of a diverging prism is directed in the opposite direction. Also in each case, the taper is such that a notional, radially directed line extending along either the front surface or the rear surface of the annulus is a substantially straight line.

The same modifications can also be made to penannular prisms.

Other modifications will be apparent to those skilled in the art and, therefore, the invention is defined in the claims.

What is claimed is:

1. A penannular prism for refracting radiation, comprising:
    an incomplete annulus of material transparent to said radiation, said incomplete annulus having a radially directed taper from a first edge of said incomplete annulus to a second edge of said incomplete annulus, said first edge being defined by one of an outer periphery of said incomplete annulus and a central aperture of said incomplete annulus, said second edge being defined by the other of said outer periphery of said incomplete annulus and said central aperture of said incomplete annulus, said radially directed taper being a straight line taper such that a notional radially directed line extending from said first edge to said second edge along a front or rear surface of said incomplete annulus is a substantially straight line.

2. The penannular prism of claim 1 wherein said first edge is defined by the central aperture of said incomplete annulus and said second edge is defined by the outer periphery of said incomplete annulus.

3. The penannular prism of claim 2 wherein said front surface and said rear surface converge to form said outer periphery.

4. The penannular prism of claim 2 further comprising an inner surface which defines an inner circumference of said incomplete annulus, said inner surface being coaxial with a principal axis of said incomplete annulus.

5. The penannular prism of claim 4 wherein a cross section of said incomplete annulus, formed by a plane perpendicular to said principal axis and being bounded by a first notional radially directed line extending along said front surface from said first edge to said second edge, a second notional radially directed line extending along said rear surface from said first edge to said second edge, and said inner surface, is triangular.

6. The penannular prism of claim 5 wherein said triangular cross section is in the shape of an isosceles triangle.

7. The penannular prism of claim 1 wherein said front and rear surfaces are optically finished.

8. The penannular prism of claim 1 wherein said first edge is defined by the outer periphery of said incomplete annulus and said second edge is defined by the central aperture of said incomplete annulus.

9. The penannular prism of claim 8 wherein said front surface and said rear surface converge to form an inner circumference of said incomplete annulus.

10. The penannular prism of claim 8 further comprising a peripheral surface which defines an outer circumference of said incomplete annulus, said peripheral surface being coaxial with a principal axis of said incomplete annulus.

11. The penannular prism of claim 10 wherein a cross section of said incomplete annulus, formed by a plane perpendicular to said principal axis and being bounded by a first notional radially directed line extending along said front surface from said first edge to said second edge, a second notional radially directed line extending along said rear surface from said first edge to said second edge, and said peripheral surface, is triangular.

12. The penannular prism of claim 11 wherein said triangular cross section is in the shape of an isosceles triangle.

13. Eyeglasses comprising:
    a lens; and
    an annular prism attached to said lens, said prism including an annulus of transparent material, said annulus having a radially directed taper from a first edge of said annulus to a second edge of said annulus, said first edge being defined by a central aperture of said annulus, said second edge being defined by an outer periphery of said annulus, said radially directed taper being a straight line taper such that a notional radially directed line extending from said first edge to said second edge along a front or rear surface of said annulus is a substantially straight line.

14. Eyeglasses comprising:
    a lens; and
    a penannular prism attached to said lens, said prism including an incomplete annulus of transparent material, said incomplete annulus having a radially directed taper from a first edge of said incomplete annulus to a second edge of said incomplete annulus, said first edge being defined by one of an outer periphery of said incomplete annulus and a central aperture of said incomplete annulus, said second edge being defined by the other of said outer periphery of said incomplete annulus and said central aperture of said incomplete annulus, said radially directed taper being a straight line taper such that a notional radially directed line extending from said first edge to said second edge along a front or rear surface of said incomplete annulus is a substantially straight line.

15. A method comprising:
placing an annular prism in front of an eye of a user to compensate for vision loss, said annular prism being formed from an annulus of material transparent to visible light, said annulus having a radially directed taper from a first edge of said annulus to a second edge of said annulus, said first edge being defined by one of an outer periphery of said annulus and a central aperture of said annulus, said second edge being defined by the other of said outer periphery of said annulus and said central aperture of said annulus, said radially directed taper being a straight line taper such that a notional radially directed line extending from said first edge to said second edge along a front or rear surface of said annulus is a substantially straight line.

16. The method of claim 15 wherein said vision loss comprises central field vision loss and said first edge is defined by the central aperture of said annulus and said second edge is defined by the outer periphery of said annulus.

17. The method of claim 16 wherein said central field vision loss comprises macular degeneration.

18. The method of claim 15 wherein said vision loss comprises peripheral field vision loss and said first edge is defined by the outer periphery of said annulus and said second edge is defined by the central aperture of said annulus.

19. The method of claim 18 wherein said peripheral field vision loss comprises retinitis pigmentosa.

20. Eyeglasses comprising:
a lens; and
an annular prism attached to said lens, said prism including an annulus of transparent material, said annulus having a radially directed taper from a first edge of said annulus to a second edge of said annulus, said first edge being defined by an outer periphery of said annulus, said second edge being defined by a central aperture of said annulus, said radially directed taper being a straight line taper such that a notional radially directed line extending from said first edge to said second edge along a front or rear surface of said annulus is a substantially straight line.

* * * * *